(12) United States Patent
Pastor

(10) Patent No.: US 10,318,522 B2
(45) Date of Patent: Jun. 11, 2019

(54) TRIGGERING OF A SOFTWARE APPLICATION BY THE USE OF A CARTOGRAPHIC REPRESENTATION

(71) Applicant: Alcatel Lucent, Boulogne Billancourt (FR)

(72) Inventor: Alain Pastor, Nozay (FR)

(73) Assignee: Alcatel Lucent, Nozay (FR)

( * ) Notice: Subject to any disclaimer, the term of this patent is extended or adjusted under 35 U.S.C. 154(b) by 207 days.

(21) Appl. No.: 14/381,303

(22) PCT Filed: Feb. 20, 2013

(86) PCT No.: PCT/EP2013/053399
§ 371 (c)(1),
(2) Date: Aug. 27, 2014

(87) PCT Pub. No.: WO2013/127678
PCT Pub. Date: Sep. 6, 2013

(65) Prior Publication Data
US 2015/0100597 A1   Apr. 9, 2015

(30) Foreign Application Priority Data
Feb. 27, 2012   (EP) .................................... 12305228

(51) Int. Cl.
*G06F 16/24* (2019.01)
*H04W 4/021* (2018.01)
(Continued)

(52) U.S. Cl.
CPC .......... *G06F 16/24* (2019.01); *G06F 16/9537* (2019.01); *H04L 67/12* (2013.01);
(Continued)

(58) Field of Classification Search
CPC .......... G06F 17/30386; G06F 17/3087; H04L 67/12; H04L 67/18; H04W 4/005; H04W 4/021; H04W 4/043
(Continued)

(56) References Cited

U.S. PATENT DOCUMENTS

| 2004/0128215 A1 | 7/2004 | Florance et al. |
| 2005/0048987 A1 | 3/2005 | Glass |

(Continued)

FOREIGN PATENT DOCUMENTS

| CN | 1913682 A | 2/2007 |
| JP | 2005-295168 A | 10/2005 |

(Continued)

OTHER PUBLICATIONS

English Bibliography for Japanese Patent Application Publication No. JP2005295168A, published Oct. 20, 2005, printed from Thomson Innovation on Nov. 13, 2015, 3 pp.

(Continued)

*Primary Examiner* — Hicham Skhoun
(74) *Attorney, Agent, or Firm* — Fay Sharpe LLP

(57) ABSTRACT

A method for triggering a software application accessible from a mobile terminal connected to a communication network and using at least one physical object, comprising:
a step of selecting an application from among an available set of applications,
a step of delimiting at least one geographic area on a cartographic representation (i.e. a map), by the user of the mobile terminal,
a step of automatically determining a set of active physical objects located in the at least one geographic area and having an interface with the communication network, (Continued)

Figure 3:
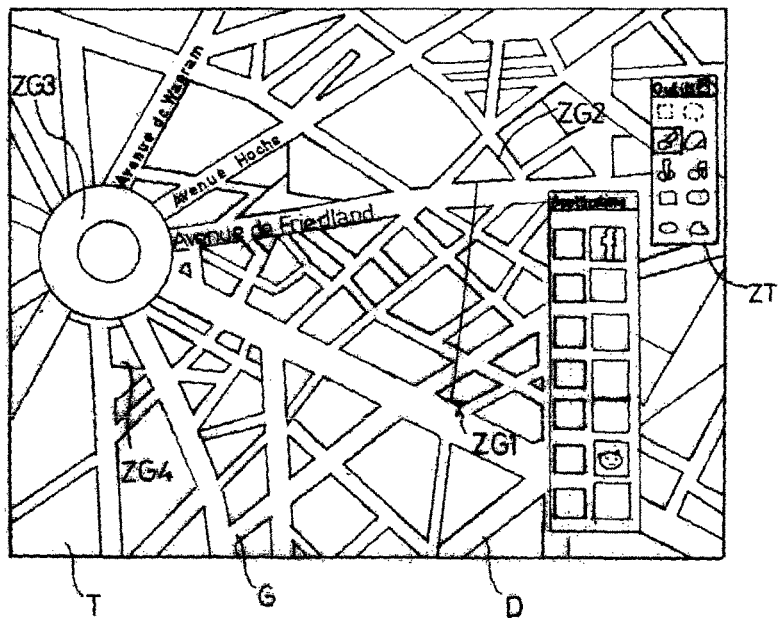

a step of interfacing said application with the subset of physical objects among said set of physical objects.

20 Claims, 2 Drawing Sheets

(51) Int. Cl.
    *H04W 4/04*         (2009.01)
    *H04L 29/08*       (2006.01)
    *H04W 4/70*         (2018.01)
    *G06F 16/9537*    (2019.01)

(52) U.S. Cl.
    CPC ............. *H04L 67/18* (2013.01); *H04W 4/021* (2013.01); *H04W 4/043* (2013.01); *H04W 4/70* (2018.02)

(58) Field of Classification Search
    USPC ........................................................ 707/758
    See application file for complete search history.

(56) References Cited

U.S. PATENT DOCUMENTS

| | | | |
|---|---|---|---|
| 2005/0054292 A1* | 3/2005 | Janusz | H04Q 9/00 455/41.2 |
| 2006/0075216 A1* | 4/2006 | Vaha-Sipila | G06F 21/575 713/2 |
| 2007/0061448 A1 | 3/2007 | Takahashi et al. | |
| 2008/0098068 A1 | 4/2008 | Ebata | |
| 2008/0200118 A1 | 8/2008 | Kubo et al. | |
| 2009/0322690 A1* | 12/2009 | Hiltunen | G06F 1/1649 345/173 |
| 2010/0079501 A1* | 4/2010 | Ikeda | G06F 3/0485 345/661 |
| 2010/0120401 A1* | 5/2010 | Mears | H04M 1/274516 455/414.1 |
| 2010/0302143 A1* | 12/2010 | Spivack | A63F 13/12 345/157 |
| 2011/0093515 A1* | 4/2011 | Albanese | G06Q 30/02 707/812 |
| 2013/0097197 A1* | 4/2013 | Rincover | G06F 17/3087 707/766 |

FOREIGN PATENT DOCUMENTS

| | | |
|---|---|---|
| JP | 2008-205655 A | 9/2008 |
| JP | 2009-146137 A | 7/2009 |
| WO | 2004114712 A1 | 12/2004 |
| WO | WO 2006/051181 A1 | 5/2006 |
| WO | 2011060388 A1 | 5/2011 |

OTHER PUBLICATIONS

English Bibliography for Japanese Patent Application Publication No. JP2008205655A, published Sep. 4, 2008, printed from Thomson Innovation on Nov. 13, 2015, 4 pp.

English Bibliography for Japanese Patent Application Publication No. JP2009146137A, published Jul. 2, 2009, printed from Thomson Innovation on Nov. 13, 2015, 4 pp.

English Bibliography for PCT Patent Application Publication No. WO2004114712A1; printed published Dec. 29, 2004, from Thomson Innovation on Nov. 13, 2015, 4 pp.

EP Pat App. No. 12305228, Extended European Search Report, dated Aug. 21, 2012, 9 pp.

PCT Pat. App. No. PCT/EP2013/053399, Written Opinion of the International Searching Authority, dated May 27, 2013, 7 pp.

C. Frank et al., "The sensor internet at work: Locating everyday items using mobile phones," Pervasive and Mobile Computing, vol. 4, No. 3, pp. 421-447, XP022672760, Jun. 1, 2008.

Dominique Guinard et al., "Discovery and On-demand Provisioning of Real-World Web Services," Web Services, 2009 IEEE International Conference on Web Services, pp. 583-590, XP031497865, Jul. 6, 2009.

Vlad Trifa et al., "Design of a Web-based Distributed Location-Aware Infrastructure for Mobile Devices," Pervasive Computing and Communications Workshops, 2010 8th IEEE International Conference, pp. 714-719, XP031679903, Mar. 29, 2010.

Dominique Guinard et al., Interacting with the SOA-Based Internet of Things: Discovery, Query, Selection, and On-Demand Provisioning of Web Services, IEEE Transactions on Services Computing, IEEE, vol. 3, No. 3, pp. 223-235, XP011303191, Jul.-Sep. 2010.

Dongxiang Zhang et al., "Locating mapped resources in Web 2.0," Data Engineering (ICDE), 2010 IEEE 26th International Conference, pp. 521-532, XP031657911, Mar. 1, 2010.

Michel S. et al., "Environmental Monitoring 2.0," Data Engineering, IEEE International Conference on Data Engineering, pp. 1507-1510, XP031447863, Mar. 29, 2009.

Atzori L. et al., "The Internet of Things: A Survey," Computer Networks, Elsevier Science Publishers B.V., vol. 54, No. 15, pp. 2787-2805, XP027289940, Oct. 20, 2010.

International Search Report for PCT/EP2013/053399 dated May 27, 2013.

Guinard et al., Towards the Web of Things: Web Mashups for Embedded Devices, Proceedings of International WWW (World Wide Web) Conferences, Madrid, 2009, 8 pp.

English Bibliography for Chinese Patent Application Publication No. CN1913682A, published Feb. 14, 2007, printed from Derwent Innovation on Nov. 17, 2017, 4 pp.

* cited by examiner

FIG_1
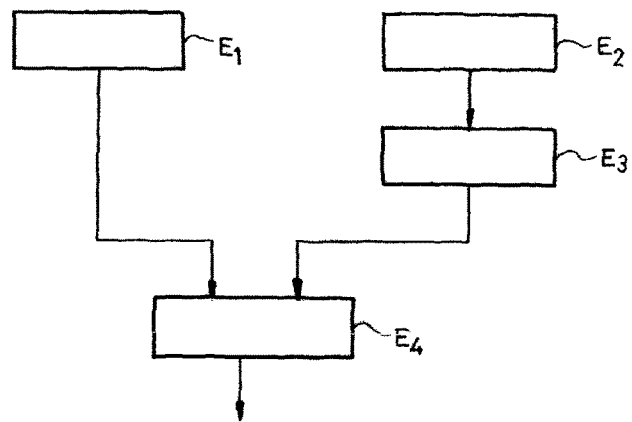
FIG_2
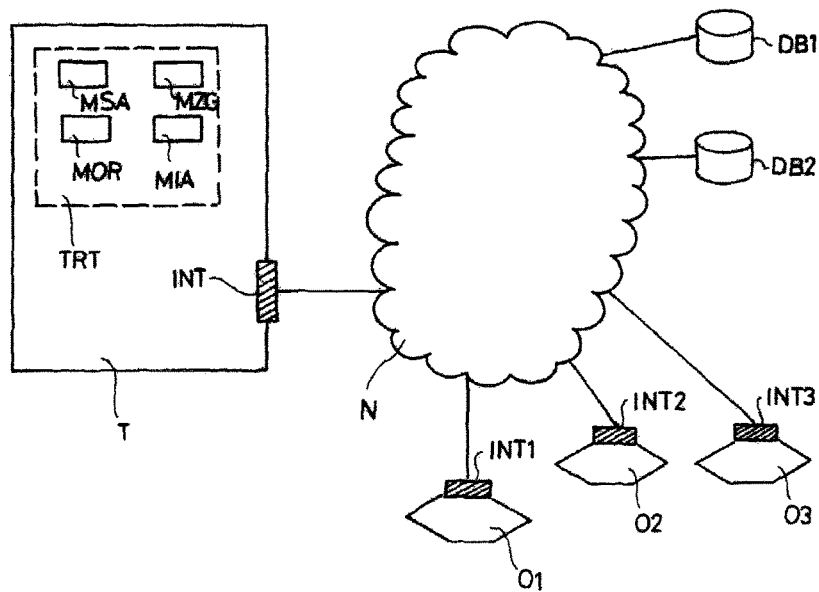

TRIGGERING OF A SOFTWARE APPLICATION BY THE USE OF A CARTOGRAPHIC REPRESENTATION

The present invention relates to the triggering of a software application using at least one physical object and accessible from a mobile terminal connected to a communication network.

The invention relates to the Internet of Things, or more precisely, the Web of Things, which consists of turning physical objects from real life into resources available via the web, which may thereby potentially communicate with one another: Lamps, television sets, communication terminals, advertising signs, traffic signals, household appliances, etc. may interface with one another via the Internet and the software applications available through it, and thereby allow new possibilities.

These concepts and new possibilities are, for example, described on the website w/w.webofthings.com and in the article "Towards the Web of Things: Web Mashups for Embedded Devices" by Dominique Guinard and Vlad Trifa, published in Proceedings of International WWW (World Wide Web) Conferences, Madrid, 2009.

The user of a mobile communication terminal may thereby use a software application benefiting from the options (or services) offered by the surrounding physical objects.

Some software applications might only be triggered in the presence of certain physical objects—or more specifically, physical objects that have a feature necessary for the software application. For example, a software application consisting of viewing a film must necessarily interface with a physical object having a screen and potentially the right codecs to display the film.

Nonetheless, the majority of developments for the Web of Things focus on the connection between physical objects and software applications, but do not really consider the issue caused by the mobility of users, who may move about, with the environment changing as they move, as do the available physical objects.

Thus, there are no simple ways for the user to correctly manage the connection between the available software applications of the physical objects available in a given environment. For example, it is not possible to program the triggering of a given software application in advance when the user reaches a geographic area using and/or based on the physical objects located there.

The purpose of the invention is to remedy this shortcoming.

To do so, the invention proposes a method for triggering a software application accessible from a mobile terminal connected to a communication network and using at least one physical object. This method comprises:
  a step of selecting a (software) application from a set of available (software) applications,
  a step of delimiting at least one geographic area on a cartographic representation (i.e. a map), by the user of the mobile terminal,
  a step of automatically determining a set of active physical objects located in the at least one geographic area and having an interface with the communication network,
  a step of interface of the application with a subset of physical objects among the set of physical objects.

In some embodiments of the invention, this subset may be determined dynamically based on the previously determined set of active physical objects and on the geographic location of the mobile terminal.

The at least one area may be formed of two separate geographic areas, and the application may in such a case deploy a single application session in both geographic areas.

The at least one geographic area may comprise a path.

The automatic determination of a set of physical objects may be performed dynamically at the same time as the delimiting of at least one geographic area.

A further purpose of the invention is a communication terminal having a human-machine interface comprising
  a screen enabling the display of a cartographic representation,
  first control means for selecting an application from a set of available applications, and
  second control means for delimiting at least one geographic area on that cartographic representation.

The terminal further comprises processing means
  for automatically determining a set of active physical objects located in the at least one geographic area and having an interface with a communication network, and
  for interfacing that application with a subset of physical objects from among the previously determined set.

A further purpose of the invention is a computer program having code means provided for implementing the previously described method when deployed on a communication terminal.

For this reason, the user may program the triggering of a software application in advance in a geographic area that it may determine via a cartographic representation. The physical objects available in that area are automatically determined, and the software application may interface with those physical objects (or some of them) in order to make it possible to trigger the software application.

The invention, its characteristics, and its benefits will become apparent in the following description, in connection with the attached figures.

FIG. 1 depicts one possible sequence of the steps of the inventive method.

FIG. 2 schematically depicts a general architecture in which the invention is likely to fit.

Figure 4:
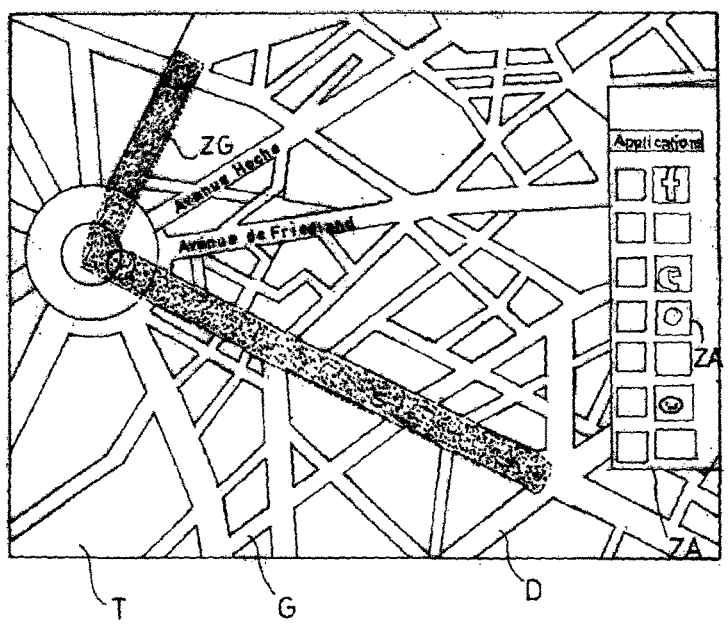

FIGS. 3 and 4 depict two example human-machine interfaces for the implementation of the invention.

The communication terminal T depicted in FIG. 2 has processing means TRT comprising multiple modules MZG, MIA, MOR, MSA. In a conventional manner known per se, these processing means may comprise programmable electronic circuits and an operating system provided for implementing software modules made of computer code. The modules MSA, MZG, MOR, and MSA may be independent software modules, or be interlinked within a single software module.

The communication terminal T further has an interface INT enabling it to communicate with a communication network N. The communication terminal may be a mobile terminal, and the communication interface INT may in such a case be a radio interface (Wi-Fi, 3G, LTE, etc.)

The communication network N is conventionally a composite network. It may comprise a radio access network (Wi-Fi, 2G, 3G, LTE . . . ), a wired private network, a public network, etc. The invention can apply independent of the architecture of the communication network and the technologies used.

Connected to communication network N are physical objects O1, O2, O3, having an appropriate interface, respectively Int1, Int2, Int3, enabling them to communicate with that network N. This communication may potentially be carried out via an adaptor that may be embedded in the real object itself, or it may form a gateway between physical objects and the communication network.

These physical objects may be of different natures. They might be physical objects available in a private home, in a workspace (office, factory, workshop, etc.), in a public space (street, restaurant room, bar, hotel, etc.), etc.

Indoors, for example, they may be a lamp, a television screen, a telephone, a speaker, a digital picture frame, a media player (for DVDs, etc.), a radio, a pendulum, etc. Outdoors, they may be signal indicators (traffic lights, light-up signs), advertising media, information display screens, etc.

These physical objects may have an interface with the telecommunication network N.

Some physical objects are complex objects offering multiple services (or features) via their interface with the communication network N. A television may, for example, offer a very broad panel of services via its interface, particularly making it possible to remotely order: changing channels, setting brightness or contrast, setting volume, choosing a process to improve video or sound, etc.

Other physical objects are much simpler and offer fewer services. For example, a lamp might offer an interface that can only turn it on or off.

Selecting an Application

The inventive method comprises a step E1 in FIG. 1, consisting of selecting an application from a set of available software applications. This step may be implemented by a module MSA of the processing means TRT.

These available software applications may be embedded in the communication terminal or hosted on a remote server. In order to embed and implement software applications, the communication terminal may comprise an operating system that makes it possible to download and launch such applications, such as the iOS systems from the company Apple, Android, or Badu from the company Samsung.

FIG. 3 depicts one possible human-machine interface for implementing the invention. The communication terminal T has a screen D that makes it possible to display a geographic representation G (which will be explained later on) and a set of tools. Some of those tools may be organized in the form of fixed or floating menus, etc., in a manner known per se.

Some of those tools are provided for selecting a software application. They may be combined in the form of a specific toolbar ZA, in which each icon corresponds to an application. This toolbar forms the control means enabling the user of the communication terminal T to simply select one application from among those offered by clicking on the corresponding icon.

Software applications may be software applications embedded in the communication terminal T, but they may also comprise applications available via the communication network T. Once selected, the application may then be downloaded and installed on the communication terminal. Other types of applications might not require a download and be accessible remotely (web applications, applications in Ajax language, etc.)

The available applications may be referenced in a database DB2 accessible via the communication network T. The embedded applications may be referenced in an internal database within the communication terminal in a manner known per se and depending on the operating system used.

Delimiting at Least One Geographic Area

The invention also comprises a step E2 of delimiting at least one geographic area of the graphic representation G displayed on the screen D of the communication terminal T. This step may be implemented by a module MZG of the processing means TRT.

This step E2 may be performed subsequent to the step E1 of selecting an application, but it may also be performed before. For this reason, a choice has been made to represent those two steps E1 and E2 on two branches of the algorithmic representation of FIG. 1.

The cartographic representation G corresponds to a real geographic area. It may be determined by the user himself or herself (who may indicate the name of a town, GPS coordinates, etc.), by geo-locating the mobile terminal, or by any other means. The determining and display of the cartographic representation G are prerequisite conditions that do not fall within the subject matter of the present invention.

By means of the human-machine interface, the user may delimit one or more geographic areas.

This delimiting may be performed with design software: It may trace a geometric shape using a mouse, for example by previously selecting a type of geometric shape in a menu or toolbar ZT. This toolbar ZT forms control means for particularly choosing a type of shape from a set of offered types: rectangle, circle, polygons, etc. Once the type has been selected, the user can trace the desired shape in the desired location on the cartographic representation G.

FIG. 3 shows multiple examples of such shapes. The geographic areas ZG1 and ZG2 are triangle-shaped, while the geographic area is ring-shaped. The geographic area ZG4 is polygonal. It is also possible to provide advanced help mechanisms. For example, the geographic area ZG4 may be produced by an image analysis mechanism that isolates a block of housing units by detecting the contours of roads: The user can choose this tool with the toolbar ZT and then indicate a point on the map, and the processing means TRT will automatically determine the block to which the point in question belongs, and therefore the geographic area ZG4.

It is also possible to connect geographic areas, as has been done for the geographic areas ZG1 and ZG2. To do so, the user chooses the appropriate tool from the toolbar ZT and indicates the two areas or traces a line between the two areas.

The impact of a connection depends on the software application selected during step E1.

Automatic Determination of Active Physical Objects in the Area

The invention then comprises a step E3 of automatically determining a set of active physical objects located in the previously delimited geographic areas and having an interface with the communication network N. This step may be implemented by a module MOR of the processing means TRT.

Here, a physical object is said to be "active" if it is capable of effectively communicating with the communication network N. To do so, some objects need to be suitably powered, turned on, and/or configured.

It may be provided to display the active physical objects on the cartographic representation G. This display may be subject to the number of determined active physical objects.

In order to determine the active physical objects that are present, multiple implementations are possible.

A database DB1 may be provided in order to reference the available physical objects. This database may associate physical objects and their geographic positions. It may, for example, contain records associating identifiers of physical objects with characteristics (types, capacities offered, etc.), states (active/non-active), and those geographic positions.

The geographic position may consist of a longitude/latitude pair. It may also comprise an altitude.

It is then possible to determine the set of active physical objects by transmitting to that database DB1 a request containing characteristics of the delimited geographic area(s). A search engine may, for example, compare the geographic positions of the physical objects present in the database DB1 and those of the geographic area.

Interfacing

The invention also comprises a fourth step E4 of interfacing the selected application with a subset of physical objects among the set of physical objects determined in step E3. This step may be partially implemented by an application interface module MIA of the processing means TRT of the communication terminal T.

This interfacing makes it possible to trigger the selected application by allowing it to use physical objects. It might use only one subset of the physical objects present; that subset may potentially be as small as a single object.

This subset may be determined dynamically by the geographic location of the mobile terminal. In other words, the processing means can implement a process running in the background, which makes it possible to refresh that subset based on the position of the communication terminal. For this reason, when the user moves around, the available active physical objects may change, and the selected software application might end up using a different subset.

Before the application is actually triggered, the invention may comprise a step of verifying that the application can really be deployed for the subset of physical objects.

This is because the applications may have requirements. Those requirements may be input interface points that require an incoming flow of information, and output interface points that require being able to transmit an outgoing flow of information. Alternatively, those requirements may be types of physical objects that must necessarily (or perhaps optionally) be present in order to implement the application.

The database D2 may combine the references of the applications with the requirements, for example in the form of a description that may comply with the language XML (Extensible Markup Language) as in the simplified example below:

This example is a description of an application named "blinkcall" that makes it possible, when receiving an incoming phone call, to cause a lamp to blink and to display the caller's name on a screen.

This application therefore uses for the physical objects as indicated in the last three <attr> attributes: a telephone ("phone"), a lamp ("lamp"), and a screen ("screen"). The earlier attributes give other information, such as the application's name, its creator's name, an image, and a description (intended to be displayed on the screen of the terminal T), its price, etc.

The application interface module MIA can use these descriptions in order to verify whether the selected application can effectively interface in the delimited geographic area. In concrete terms, this means searching for the active physical objects available in that area which can meet the requirements indicated in the application's description.

If they are not found, the user can be informed, and he or she may be prompted to choose another geographic area, particularly to expand those dimensions in order to include more physical objects.

He or she may be told which type of physical object is missing so that he or she can, if possible, request it.

He or she may also be prompted to trigger the application anyway, which can then operate in safe mode.

In one particular embodiment, this verification may be performed during step E2 of delimiting a geographic area in real time. While the user is tracing the shape of the geographic area on the cartographic representation G, the verification is performed dynamically, and a display allows the user to tell whether the current area makes it possible or not to deploy the selected application. This display may be any graphical indicator. It may be possible, for example, to alter the color of the geographic area being traced based on that verification. This embodiment makes it possible to guide the user in order to delimit an optimal geographic area, which may be an important criterion in some contexts.

The triggering itself may be done immediately after interfacing, or may be postponed until an event appears. This event may particularly be tied to geo-locating the communication terminal T and comparing it with the geographic area(s). For example, when the communication terminal T enters the previously delimited geographic area, an event is

```
<application id="blinkcall ">
    <attrs>
        <attr name="state"><value>disable</value></attr>
        <attr name="configured"><value>no</value></attr>
        <attr name="name"><value> blinkcall Application</value></attr>
        <attr name="image"><value>appli_ blinkcall.png</value></attr>
        <attr name="description"><value>The blinkcall Application allows you to
prompt the caller name on a screen and to blink a lamp when your phone
rings</value></attr>
        <attr name="creator"><value>Monique</value></attr>
        <attr name="rate"><value>4.5</value></attr>
        <attr name="price"><value>2$</value></attr>
        <attr name="nbvo"><value>3</value></attr>
        <attr name="vo_1_kind"><value>
            <div class="rwobject"><span class ="kind">phone</span></div>
            </value></attr>
        <attr name="vo_2_kind"><value>
            <div class="rwobject"><span class ="kind">lamp</span></div>
            </value></attr>
        <attr name="vo_3_kind"><value>
            <div class="rwobject"><span class ="kind">screen</span></div>
            </value></attr>
    </attrs>
</application>
``` generated, and the software applications tied to that geographic area are triggered using the physical objects (either those previously determined, or dynamically determined at that time).

The choice of trigger moment may depend on the user's choice, but may also depend on the nature of the software application.

As previously described, the steps of the inventive method may be ordered in different ways.

Thus, it is possible for the user to first select an application, then delimit a geographic area; or alternatively, to first delimit a geographic area, then select a software application.

It should be noted that which of these options to choose may be left up to the user, or may be mandatory.

This choice may also have technical consequences.

For example, the delimiting of a geographic area may immediately trigger the next step of automatically determining a set of active physical objects located in the geographic area and having an interface with the communication network. Based on the set of active physical objects thereby determined, it is possible to present to the user only some of the available software applications. This implementation therefore have an additional technical benefit that may be useful.

Uses

The invention may be used in different contexts.

A first implementation may involve a dispatcher of a fleet of service vehicles. It may, for example, be a fire department dispatcher.

He or she chooses, on his or her communication terminal T, the fleet management application, and then creates a geographic area. This geographic area may be a path ZG as in the example of FIG. 4, which leads from the fire department to the intervention site. A parameter may be added containing the identifiers of the vehicles that will be deployed to the site.

When the vehicles are in the area ZG, depending on the location, the application will interface with the "traffic signal" physical objects in order to turn them green in front of the fleet.

The application may further indicate the progress of the fleet, the state of the traffic signals, and dynamically change the area ZG based on the progress of the fleet.

Another implementation may concern infrastructure management, such as road infrastructure or industrial infrastructure at a massive site, etc.

The manager may select a monitoring application and trace an area corresponding to an area to be monitored. The application will automatically interface with the physical objects present in that area, and conduct a series of tests. Physical objects that have failed to those tests may then be reported to the manager via the human-machine interface. He or she may then trigger a second application for sub-areas of the geographic areas in order to deploy technicians there. This second application makes it possible to help technicians replace faulty equipment, and help the manager view the progress of those repairs.

A third implementation may make it possible to connect two geographic areas ZG1, ZG2 as previously described. The user creates two separate areas ZG1 and ZG2 and connects them. Those geographic areas may, for example, correspond to two common locations in his or her routine: His or her home and workplace, for example. The connection between the two areas makes it possible to indicate that the selected application must create a single application session for both areas or create a logical application link between those two areas.

It may, for example, be a telephony application: When his or her child enters the house (area ZG1), the application automatically triggers a phone call between the house and workplace (area ZG2) of the user. Specifying areas (rather than particular physical objects) makes it possible to postpone the choosing of the physical object until the moment when the call is triggered: The application will look at that time to see which active physical object will make it possible to call: A mobile phone, a television set with telecommunication capabilities if it is on, etc.

A fourth implementation consists of delimiting an ecological or preferred transportation area. The user wishes to use a mode of transportation and he or she traces an area around that mode of transportation (area ZG in FIG. 4, for example). He or she selects an application related to that transportation and associates it with that area ZG.

Whenever his or her travels cause him or her to cross that geographic area ZG, the selected application is automatically triggered and may offer him or her the upcoming schedule of that line.

The invention has many possible implementations, because the underlying mechanism of the invention consisting of "drawing" an application's area of influence on a map is novel and a total change from existing habits. It therefore opens the door to a vast field of possible applications.

The invention claimed is:

1. A method for triggering a software application accessible from a mobile terminal connected to a communication network and using at least one real physical object, the method comprising:
   detecting selection of a selected application by a user of a mobile terminal from among a set of available applications displayed on a screen of the mobile terminal, the set of available applications being accessible to the mobile terminal;
   permitting the user to delimit at least one geographic area on a cartographic representation displayed on the screen of said mobile terminal;
   accessing a description of the selected application, the description comprising one or more requirements that are necessary for execution of said selected application;
   automatically determining a set of active real physical objects located in said at least one geographic area and accessible to the mobile terminal via a communication network, the set of active real physical objects determined based at least in part on a comparison of geographic positions of active real physical objects with characteristics of the at least one geographic area;
   searching the set of active real physical objects and selecting a subset of active real physical objects, each selected real physical object in the subset of active real physical objects meeting at least one requirement indicated in the description of said selected application; and
   interfacing said selected application with the subset of active real physical objects via the communication network;
   wherein the mobile terminal informs the user if the subset of active real physical objects does not meet all the requirements present in the selected application's description;
   wherein the mobile terminal proposes choosing another geographic area in response to detecting that the subset of active real physical objects does not meet all the requirements present in the selected application's description.

2. The method according to claim 1, wherein said subset of active real physical objects is dynamically selected based at least in part on a geographic location of said mobile terminal.

3. The method according to claim 1, wherein said at least one geographic area includes two separate geographic areas that are connected and said selected application deploys a single application session for both of the two separate geographic areas.

4. The method according to claim 1, wherein said automatically determining of the set of active real physical objects is dynamically performed in relation to the user delimiting the at least one geographic area.

5. The method according to claim 1, wherein the description of the selected application is stored in a database accessible to the mobile terminal.

6. The method according to claim 1, wherein the mobile terminal proposes expanding the at least one geographic area in response to detecting that the subset of active real physical objects does not meet all the requirements present in the selected application's description.

7. The method according to claim 1, wherein the mobile terminal indicates a missing type of real physical object in response to detecting that the subset of active real physical objects does not meet all the requirements present in the selected application's description.

8. The method according to claim 1, wherein the mobile terminal proposes an operation of the selected application in safe mode in response to detecting that the subset of active real physical objects does not meet all the requirements present in the selected application's description.

9. A communication terminal for use in a communication network, the communication terminal comprising:
at least one processor and associated memory;
a human-machine interface comprising a screen configured to display a cartographic representation for viewing by a user of the communication terminal; and
a communication interface in operative communication with the at least one processor and configured to facilitate communications between the communication terminal and one or more real physical objects via a communication network;
wherein the at least one processor and the human-machine interface are configured to display a set of available applications accessible to the communication terminal on the screen and configured to detect selection of a selected application by the user from among the set of available applications;
wherein the at least one processor and the human-machine interface are configured to permit the user to delimit at least one geographic area on said cartographic representation;
wherein the at least one processor is configured to obtain a description of the selected application, the description comprising one or more requirements that are necessary for execution of said selected application;
wherein the at least one processor is configured to automatically determine a set of active real physical objects located in said at least one geographic area and accessible to the communication terminal via the communication network, the set of active real physical objects determined based at least in part on a comparison of geographic positions of active real physical objects with characteristics of the at least one geographic area;
wherein the at least one processor is configured to search the set of active real physical objects and select a subset of active real physical objects, each selected real physical object in the subset of active real physical objects meeting at least one requirement indicated in the description of said selected application;
wherein the at least one processor and the communication interface are configured to interface said selected application with the subset of active real physical objects via the communication network;
wherein the at least one processor and the human-machine interface are configured to inform the user if the subset of active real physical objects does not meet all the requirements present in the selected application's description;
wherein the at least one processor and the human-machine interface are configured to propose choosing another geographic area in response to the at least one processor detecting that the subset of active real physical objects does not meet all the requirements present in the selected application's description.

10. A non-transitory computer-readable medium storing program instructions that, when executed by at least one processor, cause a processor-controlled communication terminal to perform a method for triggering a software application accessible from the communication terminal connected to a communication network and using at least one real physical object, the method comprising:
detecting selection of a selected application by a user of a communication terminal from among a set of available applications displayed on a screen of the communication terminal, the set of available applications being accessible to the communication terminal;
permitting the user to delimit at least one geographic area on a cartographic representation displayed on the screen of the communication terminal;
accessing a description of the selected application, the description comprising one or more requirements that are necessary for execution of the selected application;
automatically determining a set of active real physical objects located in the at least one geographic area and accessible to the communication terminal via a communication network, the set of active real physical objects determined based at least in part on a comparison of geographic positions of active real physical objects with characteristics of the at least one geographic area;
searching the set of active real physical objects and selecting a subset of active real physical objects, each selected real physical object in the subset of active real physical objects meeting at least one requirement indicated in the description of the selected application; and
interfacing the selected application with the subset of active real physical objects via the communication network;
wherein the communication terminal informs the user if the subset of active real physical objects does not meet all the requirements present in the selected application's description;
wherein the communication terminal proposes choosing another geographic area in response to detecting that the subset of active real physical objects does not meet all the requirements present in the selected application's description.

11. The communication terminal according to claim 9, wherein the description of the selected application is obtained from a database accessible to the communication terminal.

12. The communication terminal according to claim 9, wherein the at least one processor is configured to obtain the geographic positions of the active real physical objects from a database accessible to the communication terminal.

13. The communication terminal according to claim 9, wherein the at least one processor and the human-machine interface are configured to propose expanding the at least one geographic area in response to the at least one processor detecting that the subset of active real physical objects does not meet all the requirements present in the selected application's description.

14. The communication terminal according to claim 9, wherein the at least one processor and the human-machine interface are configured to indicate a missing type of real physical object in response to the at least one processor detecting that the subset of active real physical objects does not meet all the requirements present in the selected application's description.

15. The communication terminal according to claim 9, the at least one processor and the human-machine interface are configured to propose an operation of the selected application in safe mode in response to the at least one processor detecting that the subset of active real physical objects does not meet all the requirements present in the selected application's description.

16. The communication terminal according to claim 9, wherein the communication terminal comprises a mobile terminal, the communication interface comprises a radio interface, and the communication network includes a radio access network accessible to the mobile terminal via the radio interface.

17. The method according to claim 1, wherein the description of the selected application is accessed from a database accessible to the mobile terminal.

18. The method according to claim 1, further comprising:
    accessing the geographic positions of the active real physical objects from a database accessible to the mobile terminal.

19. The communication terminal according to claim 9, wherein the description of the selected application is stored in a database accessible to the communication terminal.

20. The communication terminal according to claim 9, wherein said at least one geographic area includes two separate geographic areas that are connected and said selected application deploys a single application session for both of the two separate geographic areas.

\* \* \* \* \*